United States Patent Office 2,823,686
Patented Feb. 18, 1958

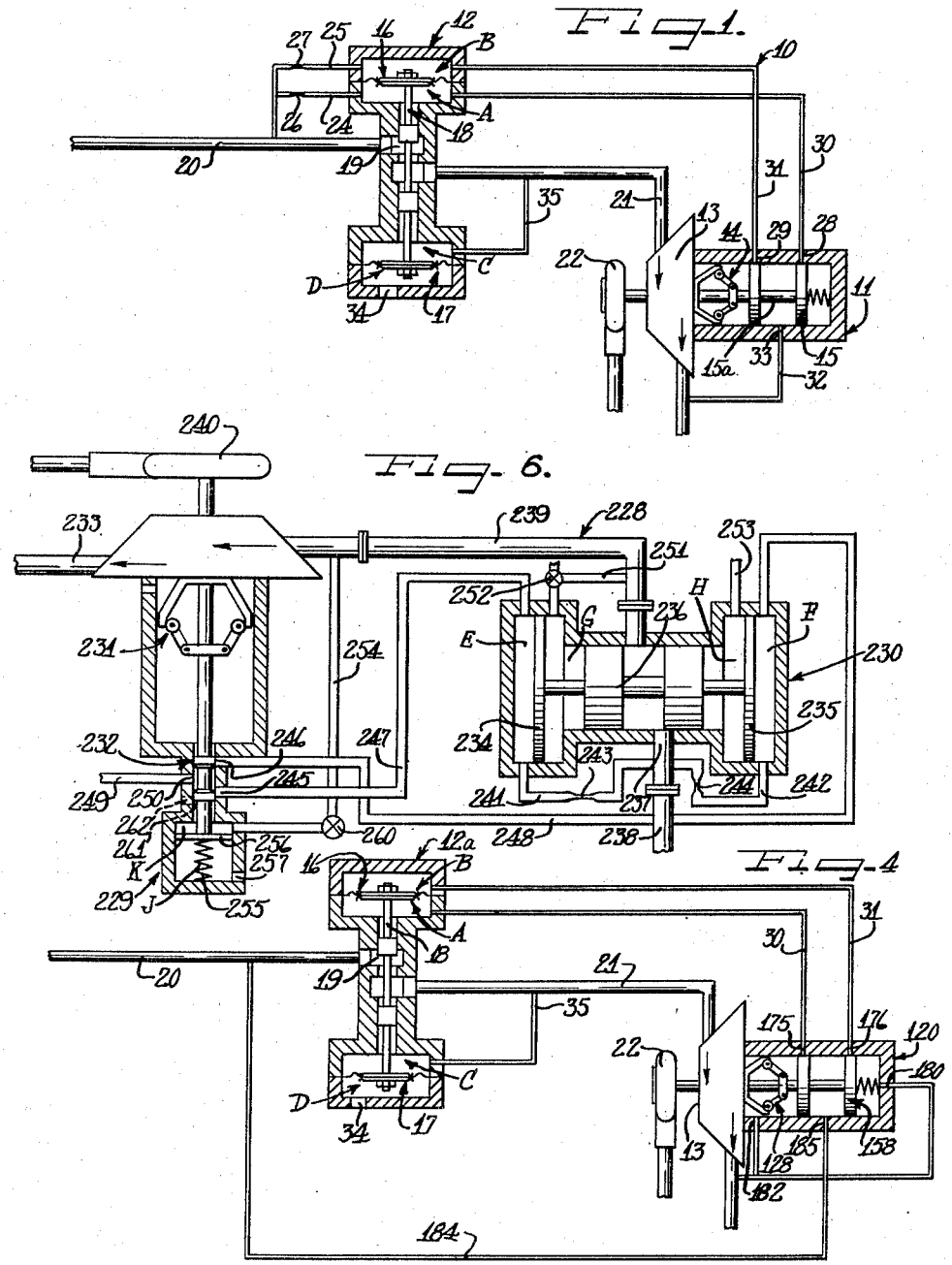

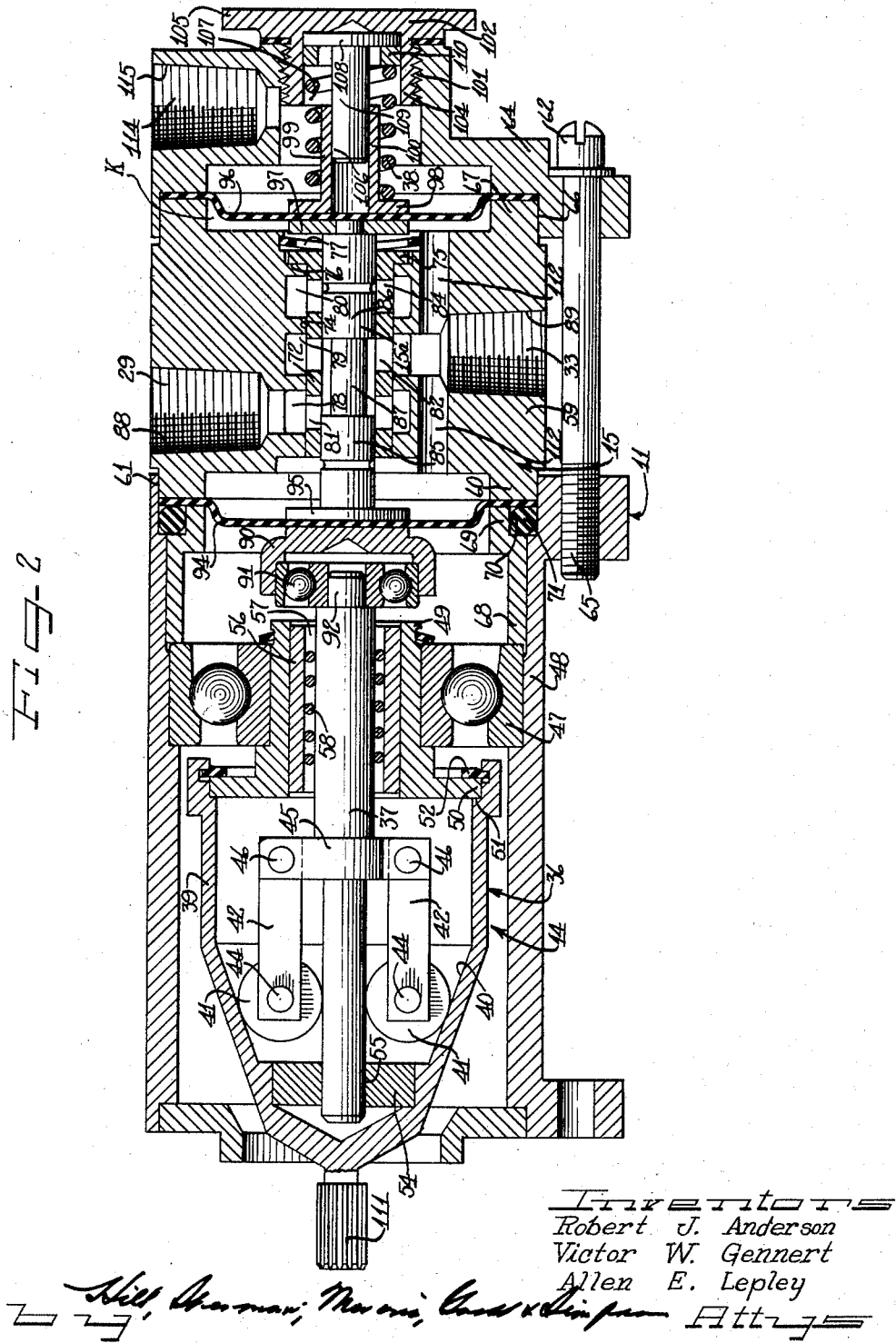

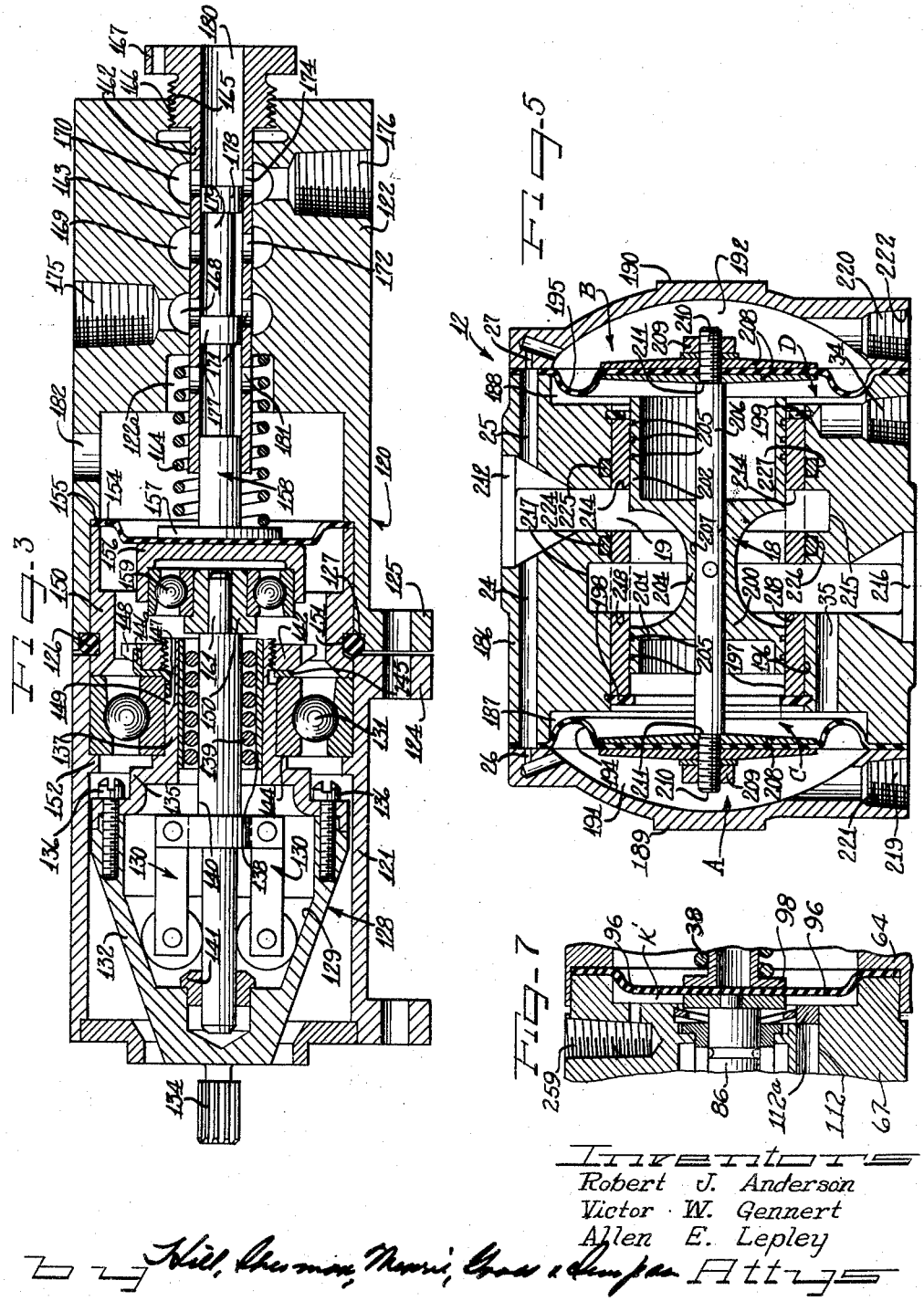

2,823,686
TURBINE CONTROL

Robert J. Anderson, Wickliffe, and Victor W. Gennert and Allen E. Lepley, Cleveland, Ohio, assignors to Thompson Products, Inc., Cleveland, Ohio, a corporation of Ohio Application April 17, 1952, Serial No. 282,862

7 Claims. (Cl. 137—29)

This invention relates to a control system for a fluid motor such as a turbine, and more specifically, the invention deals with a turbine speed control system arranged for accurate control of the rotary speed of a turbine through control of the inlet fluid flow.

In automatically controlling the rotary speed of a fluid motor, as in any constant speed control system, the major criteria for satisfactory control are sensitivity, accuracy, fast recovery rate in the presence of changing loads and conditions and the lack of fluctuation or "hunting" in maintaining a control or set speed. Of these criteria probably the most difficult to achieve in practice is the elimination or substantial elimination of hunting without the provision of complicated damping means. Ordinarily, the provision of adequate damping means results in an undesirably low rate of recovery after sudden changes in operational conditions which tend to overspeed or underspeed the fluid motor or turbine.

The turbine speed control system of the present invention is adapted to accurately control the rotational speed of the turbine and has sufficient sensitivity to instantly sense overspeeding or underspeeding in order to quickly return the turbine to the set speed. The system is provided with fast acting mechanism for quickly returning the turbine to the set speed after a fluctuation therefrom due to changing operational conditions. Very much simplified damping or feed back means are provided to substantially eliminate fluctuations above and below set speed, commonly referred to as "hunting."

According to the present invention, a speed sensing unit of a centrifugal flyweight type is connected for rotation to a fluid driven turbine which drives a working mechanism such as a pump. The sensing unit includes biasing means for opposing the flyweight induced axial movement of a rotating shaft in response to increased centrifugal force so that the shaft will assume an axial position as determined by a balancing of the opposed axial forces. A pilot valve is included in the sensing unit and has two fluid ports connected by reference lines or conduits to opposite sides of control diaphragm means in a servomechanism. The control diaphragm (or diaphragms) is positively connected to a throttle valve in the servomechanism which controls a variable orifice in the fluid supply line to the turbine. A piston in the pilot valve is adapted to alternately connect the ports therein to an ambient pressure outlet when biased from neutral position.

In one of the embodiments of the invention a pair of bleed lines are connected between the fluid supply source line and the servomechanism on opposite sides of the control diaphragm therein to supply one or both sides of the control diaphragm with high pressure fluid. Restrictions or orifices are provided in the bleed lines to induce a pressure drop in response to fluid flow in the lines for reducing the pressure on one side of the control diaphragm when that side is open to ambient pressure through the pilot valve. This moves the variable orifice in the servomechanism toward open or closed position, depending on which way the throttle valve is moved, in order to compensate for overspeeding or underspeeding of the turbine as detected by the sensing mechanism.

In the other embodiment of the invention one bleed line is connected between the fluid supply source line and the pilot valve in a manner such that supply line pressure is referenced through one port to one side of the servomechanism diaphragm when the other side is referenced to ambient pressure in order to accomplish the same result.

For damping oscillations or hunting about the set turbine speed, a plurality of damping means are provided for use alone or in combination, one type being in the form of damping diaphragm means in the servomechanism operatively connected to the throttle valve with one side of the damping diaphragm means referenced to the pressure upstream of the turbine and with the other side referenced to ambient pressure. There is substantially no time lag in the operation of the damping means so that changes instituted by the speed sensitive unit will be fed back almost instantaneously to prevent overshooting or undershooting. During substantial changes in operating conditions such as with the removal or addition of a heavy load, the damping diaphragm damps the operation of the control diaphragm to prevent large oscillatory changes about the set speed to insure a positive and accurate return to said set speed.

Another type of damping means, also a feedback device, is provided in the form of a line referencing the pressure upstream of the turbine to the pilot valve so as to bias the pilot valve from neutral position in response to variations in the upstream pressure. This feedback device may be used alone as a damping means, or it may be used in conjunction with the aforementioned feedback device, so as to obtain uniquely reliable stability of operation.

The control system accurately compensates for variations in inlet fluid density as evidenced by the inlet pressure and temperature and also accurately compensates for changes in turbine loading. The speed sensing unit is constructed to have a minimum of inherent hysteresis to allow maximum sensitivity and accuracy of control.

Particularly efficient means are provided for translating a portion of the centrifugal force acting on the flyweights into axial movement of the pilot valve so that the need for a rotating seal between the flyweight portion and the pilot valve is eliminated. The flow of relatively hot leakage air through the servomechanism helps to prevent sticking of the throttle valve during low temperature operation, and the bleed system utilized precludes the necessity of connecting an additional high pressure control line to the pilot valve.

It is, therefore, an object of the present invention to provide an improved turbine speed control system.

Another object of the invention is to provide a rotary speeed control system for a fluid motor embodying improved damping means for preventing oscillations about the set or desired speed.

A further object of the invention is to provide a turbine speed control system including a sensing unit operatively connected to the turbine and a servomechanism for translating change signals from the sensing unit into changes in fluid inlet flow to retain the turbine at a constant set speed.

Still another object of the present invention is to provide a fluid motor speed control system having a minimum of inherent hysteresis in the operating portions thereof to impart a maximum of sensitivity and accuracy in the speed control.

A still further object of the invention is to provide improved flyweight mechanism for sensing changes in rotary speed of the fluid motor.

An additional object of the invention is to provide an improved sensing unit in a turbine speed control system, eliminating the need for a rotating seal between a flyweight portion and a pilot valve portion.

An important object of this invention is the provision of improved and simplified damping means in a fluid motor rotary speed control system to substantially eliminate hunting about the set speed.

Other objects, features and advantages of this invention will be apparent from the following detailed description of two embodiments, by way of preferred examples only, taken in conjunction with the accompanying drawings.

On the drawings:

Figure 1 is a schematic, partially sectional view of a turbine speed control system according to the present invention;

Figure 2 is a longitudinal sectional view of a speed sensing unit shown schematically in Figure 1;

Figure 3 is a longitudinal sectional view of a second embodiment of a speed sensing unit;

Figure 4 is a diagrammatic view similar to Figure 1 but showing the turbine speed control system utilizing a sensing unit as shown in Figure 3;

Figure 5 is a sectional view of a servomechanism as shown in Figure 1;

Figure 6 is a diagrammatic view similar to Figures 1 and 4, but showing still another turbine speed control system embodying the invention;

Figure 7 is a fragmentary view taken from Figure 2 and showing a modified form thereof.

As shown on the drawings:

In Figure 1 is illustrated a fluid motor or turbine rotary speed control system 10 including a sensing unit assembly 11 and a servocontrol or servomechanism assembly 12 for controlling the speed of a turbine 13. The sensing unit 11 includes a flyweight governor portion 14 and a pilot valve portion 15 with the flyweight portion connected for rotation through the turbine and converting centrifugal translation of the flyweights to axial translation of the pilot valve. The servomechanism 12 includes control means 16 and damping means 17 operatively associated with a throttle valve 18 controlling a variable orifice 19 connecting a fluid supply line 20 to a turbine supply line 21. The turbine 13 is drivingly connected to a working mechanism 22 such as an aircraft booster pump.

For supplying high pressure fluid to the servomechanism 12 a pair of bleed lines 24 and 25 are connected, respectively, from the high pressure supply line 20 to a control chamber A and a control chamber B. High fluid pressure in the chamber A coacts with the control means 16 to bias the throttle valve 18 toward open position of the variable orifice 19 while high pressure in the chamber B coacts with the control means 16 in a reverse manner to close the variable orifice 19. A pair of orifices or restrictions 26 and 27 are provided in the bleed lines 24 and 25 respectively, to restrict flow into the chambers A and B to induce a pressure in response to fluid flow.

For connecting the servo control chambers A and B to a pair of ports 28 and 29 in the sensing unit 11, interconnect reference lines 30 and 31 are respectively provided. An ambient pressure reference line 32 connects the sensing unit 11 to the ambient air through a pilot port 33. In the neutral position shown in Figure 1, a pilot valve 15a closes both of the ports 28 and 29. However, when the valve 15a is biased to the right the port 28 is connected to the ambient air through the passage 32, and when the valve 15 is biased to the left, the port 29 is connected to the ambient air through the passage 32. Referencing the port 28 to the ambient atmospheric air produces a flow from the supply line 20 through the chamber A and the sensing unit 11. The consequent pressure drop through the orifice 26 reduces the pressure in the chamber A to bias the throttle valve 18 toward closing position of the variable orifice 19 responsive to the higher pressure in the chamber B. When the port 29 is referenced to ambient air, the pressure in the chamber B is lowered in a similar manner to bias the throttle valve 18 toward open position relative to the variable orifice 19 in response to the higher pressure in the chamber A.

The damping means 17 divide another portion of the schematically shown servomechanism 12 of Fig. 1 into a damping chamber C and a chamber D referenced to ambient pressure through a port or opening 34. The damping chamber C is referenced to turbine upstream pressure by means of a reference line 35 connected to the turbine supply line 21. High pressures in the chamber C augment action of the pressure in chamber B to bias the throttle valve 18 toward orifice closing position.

Referring to Figure 2, one preferred embodiment of the sensing unit assembly 11 is shown in longitudinal cross-section. The flyweight governor portion 14 of the sensing unit 11 comprises a rotor assembly 36 for biasing an axial shaft 37 to the right and compression biasing means in the form of a compression spring 38 for biasing the shaft 37 towards the left as shown in the drawings. The rotor assembly 36 includes a rotor casing 39 having an internally slanted wall portion 40 diverging toward the right with a pair of flyweights 41 adapted for traveling thereon. The flyweights 41 are rotatably connected to the end portions of arms 42 by means of pins 44, and the arms 42 are pivotally connected at their other end portions to a transverse member 45 by means of pins 46. The transverse member 45 is fixedly attached to the shaft 37 within the casing 39.

For rotatably supporting the rotor assembly 36 within the sensing unit 11 an anti-friction bearing 47 has its outer race attached within a cylindrical casing portion 48 of the sensing unit and an inner race fixedly attached to a sleeve support portion 49 of the rotor assembly. The sleeve support portion 49 has an annular rim 50 abutted against an annular shoulder 51 of the rotor casing 39 and retained thereagainst by means of a snap ring 52 to fixedly connect the casing 39 to the sleeve support portion 49.

For slidably supporting the left end portion of the shaft 37 within the rotor assembly 36 a bushing 54 is fixedly attached within the rotor casing 39 and has a central bore 55 receiving the left end portion of the shaft 37 in slidable relation therein. For slidably supporting the right end portion of the shaft 37 within the rotor assembly 36, a sleeve 56 is fixedly retained within the sleeve support portion 49 and has an axial bore 57 therethrough containing bearings 58, which, in turn, support the shaft 37 in slidable relation relative to the rotor sleeve support portion.

For controlling the pressures within the chambers A and B of the servomechanism 12 the pilot valve 15 of the pilot valve portion 15 is slidably disposed in a pilot valve casing 59 which is fixedly secured in coaxial relation relative to the casing 48 by means of an annular engagement portion 60 engaged in an axial end bore 61 formed at the right end of the casing 48. To retain the valve casing 59 in fixed coaxial relation relative to the casing 48 bolts 62 are inserted through an external flange of a cap 64 and have externally threaded end portions 65 in threaded engagement in an external flange formed on the casing 48. The cap 64 has an annular end groove 66 receiving an annular engagement portion 67 at the end of the valve casing 59 opposite to the engagement portion 60. Thus, the valve casing 59 is fixedly clamped between the casing 48 and the cap 64, all three of these portions forming the outer body of the sensing unit 11.

In order to retain the anti-friction bearing 47 within the casing 48 an annular spacer 68 is inserted within the bore of the casing 48 with its left end abutting the outer race of the bearing 47 and its right end pressed axially inwardly by the annular engagement portion 60 of the valve casing 59. An inwardly offset right end portion 69 of the spacer sleeve 68 forms an annular groove 70 which coacts with the defining wall of the casing bore 61 to receive a sealing ring 71 of suitable resilient sealing material.

The pilot valve 15a is slidably received in a sleeve member 72 which is fixedly disposed in an axial bore 74 of the valve casing 59 by means of an end flange 75 of the sleeve abutting an annular shoulder at one end of the bore 74 and a snap ring 77 engaging the flanged end of the sleeve 72 and the valve casing 59.

To provide means for controlling fluid flow through the pilot valve portion 15 three spaced annular grooves 78, 79 and 80 are formed in the surface of the bore 74 and communicate with the interior of the sleeve 72 by means of apertures 81, 82 and 84, respectively. A pair of raised annular portions 85 and 86 are formed on the valve 15 and are connected by means of a reduced diameter stem 87. When the valve 15 is in the neutral position, the raised portions 85 and 86 close the apertures 81 and 84, respectively. When the valve 15a is displaced to the left as shown in Figure 2, communication is afforded between apertures 81 and 82, and when the valve 15a is displaced to the right, communication is afforded between apertures 82 and 84. The port 29, shown schematically in Figure 1, provides communication between the annular groove 78 and the exterior of the pilot valve casing 59. As shown in Fig. 2 the port 29 is provided with a tapered, internally threaded nipple engagement portion 88. The port 33, shown schematically in Figure 1 communicates with the annular groove 79, and is provided with an internally threaded nipple engagement portion 89. The port 28, shown schematically in Figure 1, is not shown in Figure 2 but is formed similarly to the ports 29 and 33 and communicates with the annular groove 80.

In order to reciprocate the valve 15a in response to axial movement of the rotor shaft 37, a bearing retainer abutment 90 is provided at the right end of the shaft 37 and retains the outer race of an anti-friction bearing 91 in fixed relation therein. The inner race of the bearing 91 is retained in fixed relation on a reduced diameter end stem portion 92 formed on the right end portion of the shaft 37.

To seal the interior of the casing 48 from the interior of the pilot valve casing 59, a flexible diaphragm 94 is clamped around its outer peripheral portion between the right end of the sleeve 68 and the left end of the pilot casing 59. The bearing retainer 90 abuts the central portion of the left face of the diaphragm 94, and a radial flange 95 formed on the left end of the valve 15 abuts the opposite face of the diaphragm so that the central portion of the diaphragm is clamped between the bearing retainer 90 and the valve 15, without necessitating puncturing of the diaphragm, to eliminate possible sources of leakage.

Thus, the shaft 37 and the rotor assembly 36 may rotate freely with respect to the casing 48 and the valve 15a without rotating the valve while still imparting axial displacement to the valve in response to axial movement of the shaft 37.

For sealing the interior of the pilot casing 59 from the interior of the cap 64 a second diaphragm 96 is clamped along its outer peripheral portion between the axially abutting surfaces of the casing and the cap. A radial flange 97 is fixedly secured at the right end of the valve 15 and abuts the central portion of the left face of the diaphragm 96. Opposing the flange 97 on the opposite side of the diaphragm 96 is a radial flange 98 formed on the left end of a spring retainer sleeve 99. A shank portion 100 of the sleeve 99 is encircled by the compression spring 38, and the left end of the spring 38 abuts the axially inward surface of the flange 98 to urge the sleeve 99 to the left to firmly clamp the diaphragms 94 and 96 at their central portions and to provide a biasing force toward the left to oppose the biasing force imposed by action of the flyweights 41 when the rotor assembly 36 is rotated.

In order to restrain movement of the right end of the spring 38 and to close an internally threaded bore 101 in the cap 64, a retainer cover 102 has an externally threaded shank portion 104 threadedly inserted into the bore 101. A wrench engagement flange 105 is provided at the right end of the retainer cover 102 to enable insertion and removal of the same.

For guiding the spring retainer sleeve 99 and the spring 38, a sleeve guide 106 has a radial flange 108 bottomed in an axial bore 107 formed in the threaded shank 104 of the retainer cover 102 and opening into the interior of the cap 64. An integral axial shaft 109 is disposed in conforming slidable relation within the central bore of the retainer sleeve 99.

Means are provided for preloading the compression spring 38 in order to adjust the control speed setting at which the sensing unit 11 controls the rotary speed of the turbine 13. Herein such means comprise preload washers 110 (herein shown as one). Any number of washers 110 may be inserted between the flange 108 and the right end of the spring 38 in order to vary the initial compression of the spring over a wide range.

For coupling the rotor assembly 36 to the turbine 13 a drive spline 111 is provided at the left end portion of the rotor casing 39. The drive spline 111 is inserted in a mating splined aperture (not shown) in a rotor drive portion of the turbine 13.

In order that the opposed faces of the diaphragms 94 and 96 be exposed to the same biasing pressure in order not to upset the centrifugally controlled operation of the valve 15a, a pair of ambient pressure reference passages 112 are formed from the port 33, which is referenced to ambient pressure, to the opposite ends of the pilot valve casing 59. These passages 112 also insure that any axial leakage past the annular raised portions 85 and 86 of the valve 15a will be vented to the atmosphere.

The interior of the casing 48 is open to the gear case (not shown) of the turbine 13 in order to obtain lubrication for the bearings 47 and 91. However, the gear case of the turbine is maintained at substantially sea level pressure, so that a biasing force is applied to the diaphragm 94 when the ambient atmospheric pressure is different from standard sea level pressure. Hence, a vent port 114 is provided in the cap 64 to communicate with the interior thereof. This vent port 114 is also vented to the turbine gear case in order that an equal and opposite biasing force be applied to the right face of the diaphragm 96 to balance the force applied to the left face of the diaphragm 94. Therefore, the sensing unit 11 is entirely free from any net pressure bias in either axial direction.

To provide a connection to one end of a duct (not shown) connecting the interior of the cap 64 to the interior of the turbine gear case, an internally threaded tapered portion 115 is provided in the vent port 114 in a manner similar to the internal threading of the ports 29 and 33.

An alternative embodiment of a sensing unit assembly is shown in Figure 3 and designated by the reference numeral 120. The sensing unit 120 comprises a rotor casing 121 and a valve casing 122 adapted to be held in fixed abutted relation by means of bolts (not shown) in attachment flanges 124 and 125 formed on the rotor casing and the valve casing, respectively. A sealing ring 126 is provided between the abutted casings and is disposed in an annular groove 127 at the left end of the valve casing 122.

A rotor assembly 128 having slanted surfaces 129 therein and a flyweight unit 130 cooperating therewith, as explained in connection with sensing unit assembly 11, is rotatably supported within the rotor casing 121 by means of an anti-friction bearing assembly 131. The rotor assembly 128 includes a forward casing member 132 having the slanted surfaces 129 therein and provided with an attachment spline 134 at the left end thereof. A rearward bearing sleeve support portion 135 of the rotor assembly is fixedly attached to the forward portion 132 by means of screws 136 and has a tubular support portion 137 supporting a sleeve 138 therein. The sleeve 138 retains shaft support bearings 139 for slidably supporting a rotor shaft 140 at the right end portion thereof. For slidably supporting the left end portion of the shaft 140 a bushing 141 is provided.

In order to retain the inner race of the bearing 131 in fixed position on the rotor assembly 128 the right end portion of the sleeve support 135 is externally threaded to receive a nut 142 which urges the inner race of the bearing against an annular shoulder 144 formed on the sleeve support 135. A lock washer 145 is disposed between the bearing 131 and the nut 142 and has lock tabs 146 and 147 contained in a peripheral groove 148 of the nut 142 and a keyway slot 149 formed in the tubular portion 137, respectively.

For retaining the outer race of the bearing 131 in fixed relation relative to the rotor casing 121, a retainer sleeve 150 is provided within the interior of the casings 121 and 122 and is formed with an annular groove 151 receiving the inward portion of the sealing ring 126 to further insure a good seal between the abutted casings 121 and 122. The left end of the sleeve 150 abuts the outer race of the bearing 131 to urge the same against a retaining ring 152 formed integrally within the casing 121.

Means are provided for sealing the interior of the casings 121 and 122 containing the rotor assembly 128 from the interior of the casing 122 to the right of the rotor. Herein such means comprise a deflectable unperforated diaphragm 154 having its outer peripheral portion retained against an annular shoulder 155 provided in the interior of the valve casing 122 by the right end of the sleeve 150. The central portion of the diaphragm 154 is clamped between a bearing retainer abutment 156 against the left face thereof and a radial flange 157 of a pilot valve 158 against the right face thereof.

The bearing retainer 156 is fixedly retained on the outer face of an anti-friction bearing 159. The inner race of the bearing 159 is retained on a retainer bushing 150 which is, in turn, retained on a reduced diameter right end portion 161 of the shaft 140. Thus, the rotor assembly 128 is rotatably mounted within the sensing unit 120 and arranged to impart axial movement to the pilot valve 158 without rotation thereof and without the necessity of providing holes or apertures through the sealing diaphragm 154.

An elongated valve sleeve 162 is retained within a mating bore 163 through the valve casing 122. An enlarged threaded portion 165 is threadedly inserted into a mating internally threaded counterbore 166 to the right of the bore 163. A wrench receiving portion 167 is provided at the right end of the valve sleeve 162 for inserting and removing the same.

Three annular grooves 168, 169 and 170 are formed in the surface of the bore 163 and communicate with the interior of the sleeve 162 by means of apertures 171, 172 and 174, respectively.

A port 175 is provided in the valve casing 122 and communicates with the interior of the sleeve 162 thrrough the groove 168 and the apertures 171, and a port 176 communicates with the interior of the sleeve through the groove 170 and the apertures 174. A similar port, communicating with the interior of the sleeve 162 through the grooves 169 and the apertures 172, is not shown. Radially raised portions 177 and 178, connected by a reduced diameter stem portion 179 are provided on the pilot valve 158 and cooperate with the apertures through the sleeve 162 as described in connection with the sensing unit 11 as shown in Figure 2 to alternately connect the outer series of apertures 171 and 174 with the center series 172 in accordance with the position of the valve.

When the valve 158 is in the position shown in Figure 3, the apertures 174 communicate with the atmosphere through an axial vent 180. When the valve 158 is biased to the right beyond the neutral position, the apertures 171 communicate with atmosphere through an aperture 181 provided in the left end portion of the sleeve 162 and a vent aperture 182 provided through the left end portion of the valve casing 122.

In order to bias the pilot valve 168 toward the left to oppose the bias of the rotor assembly 128 imposed by the axial centrifugal force component of the flyweight unit 130, a compression spring 164 is disposed between the right face of the flange 157 and the bottom of a spring receiving chamber 122a in the valve casing 122.

In Figure 4 is illustrated a turbine speed control system similar to that shown in Figure 1 but utilizing the sensing unit assembly 120 in place of the sensing unit assembly 11. All similar portions of the figure are numbered with the same numerals used in Figure 1. It will be noted that the bleed lines 26 and 27 have been eliminated resulting in a modified servomechanism 12a. A high pressure bleed line 184 extends from the high pressure source line 20 to a port 185 which is connected to the annular groove 169 shown in Figure 3. It will also be noted that the positions of the lines 30 and 31 have been reversed in their connection to the pilot valve and are shown as connected to ports 175 and 176, respectively. The control system shown in Figure 4 operates in a similar manner to that shown in Figure 1 except that the high pressure bleed fluid first passes through the sensing unit 120 to be ultimately referenced to the chamber A or the chamber B, depending on whether the turbine 13 is underspeeding or overspeeding, respectively. When one of the chambers A or B is referenced to the high pressure source, the other chamber is referenced to the ambient atmospheric pressure through the port 182 or port 180 so that the variable orifice 19 is opened or closed by movement of the throttle valve 18. The damping or feed back system operates through the chambers C and D in the same manner as described in connection with Figure 1.

In Figure 5 is shown the servomechanism 12 which comprises a substantially cylindrical casing 186 having axial cavities or recesses 187 and 188 at the opposite ends thereof. A pair of end caps 189 and 190 are fixedly disposed over the ends of the casing 186 to close the recesses 187 and 188, respectively. The caps 189 and 190 contain respective central cavities or recesses 191 and 192. Separating means in the form of flexible diaphragms 194 and 195 have their respective outer peripheral portions clamped between the casing 186 and the end caps 189 and 190, respectively. Thus, the recesses 191, 192, 187, and 188 form separate chambers corresponding to the chambers A, B, C, and D, respectively, as shown in the schematic drawings of Figures 1 and 4.

In order to accommodate the throttle valve 18 in reciprocable relation within the casing 186, an axial bore 196 is provided therein for receiving a valve sleeve 197 in peripheral conforming relation in the bore. To fixedly retain the valve sleeve 197 within the bore 196, snap rings 198 and 199 are snapped into respective annular grooves formed in the defining wall of the bore 196 and abut the opposite faces of the sleeve. The throttle valve 18 comprises a body portion 200 having a skirt 201 and an open ended head 202 connected by a reduced diameter stem 204, with the skirt 201 being somewhat shorter than the head 202. The outer peripheral surfaces of the valve skirt 201 and head 202 are disposed in conforming slidable relation within the valve sleeve 197 and have annular sealing grooves 205 formed thereon, to guard against leakage past the heads.

In order to operatively connect the valve body portion 200 to the diaphragms 194 and 195, an elongated axial rod portion 206 of the throttle valve 18 is fixedly disposed in an axial bore 207 formed through the reduced diameter stem 204. Clamping plates 208 are clamped against the opposite surfaces of the central portions of the diaphragms 194 and 195 by means of nuts 209 threadedly inserted over threaded rod end portions 210 which extend through the clamping plates and the diaphragms at both ends of the rod 206. The axially inward clamping plates 208 at each end of the rod 206 abut annular shoulders 211 formed at each end of the rod to oppose the action of the inwardly turned nuts 209.

The reference or bleed passages 24 and 25 shown schematically in Figure 1 are incorporated as bores extending axially from a high pressure inlet port 212 which is adapted for connection to high pressure supply line 20 shown in Figures 1 and 4. The restrictions 26 and 27 are formed by reduced diameter bores in the passages 24 and 25, respectively. It will be understood that in the servomechanism 12a shown in Fig. 4 the bleed passages 24 and 25 are either plugged or not formed.

Means are provided for forming the variable orifice 19 in connection with the head 202 of the throttle valve 18. In the present instance such means comprises a plurality of radial apertures 214 through the valve sleeve 197 and communicating with the inlet port 212 by means of a groove 215 formed in the wall of the bore 196 and registering with the apertures 214. An outlet port 216 is formed in axially offset relation to the port 212 in the side wall of the servomechanism casing 186 and is adapted for connecting to the turbine inlet supply line 21 shown in the schematic drawings. The outlet port 216 communicates with the interior of the sleeve 197 by means of a groove 217 formed in the wall of the bore 196 and registering with apertures 218 formed through valve sleeve 197.

The turbine inlet reference pressure line 35 is provided in the form of an axial bore communicating between the chamber C and the outlet port 216.

The ambient pressure reference port 34 is shown as a radially formed bore communicating with chamber D.

In order to provide a connection between the pressure reference lines 30 and 31, as shown in Figures 1 and 4, with the chambers A and B of the servomechanism 12 shown in Figure 5, radially extending ports 219 and 220 are provided. The ports 219 and 220 may be internally threaded as shown at 221 and 222 for receiving attachment nipples (not shown).

Sealing means are provided at each side of the groove 215 between the surface of the bore 196 and the opposing surface of the valve sleeve 197. The sealing means are herein shown as a pair of resilient sealing rings 224–226 and 225–227 disposed in annular grooves formed in the surface of the bore 196 and abutting the opposed surface of the sleeve 197.

Reviewing the operation of the turbine speed control system shown in the schematic drawings in the light of the detailed Figures 2, 3 and 5, fluid is conducted from the high pressure source through the supply line 20 and enters the servomechanism 12 at the inlet port 212.

In the embodiment shown in Figure 1 a portion of the fluid passes through the bleed passages 24 and 25 through the orifices 26 and 27 to the chambers A and B. Through the passages 30 and 31, the fluid is conducted from the chambers A and B into the pilot valve portion 15 of the sensing unit 11 through the ports 28 and 29. From here the fluid is metered through either the apertures 81 or the apertures 84, or is blocked from passing through either set of apertures, depending upon the position of the pilot valve 15a. The position of the pilot valve 15a is determined by the rotational speed of the turbine 13 through the shaft 37 and the flyweight 41 acting against the bias of the compression spring 38. When one of the sets of ports 81 or 84 is referenced to the high pressure of the fluid supply source, the other set is referenced to ambient pressure through the port 33. The resultant flow through the port which is referenced to ambient pressure will induce a pressure drop through one of the orifices 26 or 27 to lower the pressure in either the chamber A or chamber B, to result in axial movement of the throttle valve 18 to vary the effective area of the variable orifice 19. Thus, the turbine inlet flow and the pressure in the turbine supply line 21 is controlled by the position of the throttle valve and the amount of pressure in the supply line. Pressures in chambers A, B and C produce forces which are balanced when speed is correct and produce forces which are unbalanced resulting in valve position change when speed is not correct. Since the speed of the turbine is a function of the pressure drop across the valve and the flow therethrough, the speed of the turbine will consequently be controlled.

In the system illustrated in Figure 4 the high pressure fluid from the supply source enters the servomechanism through the inlet port 212 as described above. However, the passages 24 and 25 are blocked in this instance, and the bleed line 184 is provided for conducting high pressure fluid to the sensing unit 120 through the port 185. Depending upon the position of the pilot valve 158 the fluid is either prevented from passing further or is metered through either the apertures 171 or the apertures 174 to be conducted to either the chamber A or the chamber B through the lines 30 or 31. When one set of apertures 171 or 174 is open to high pressure, the other set of apertures is referenced to ambient pressure through either the port 180 or the aperture 181 and the port 182, so that the throttle valve 18 is moved in accordance with the position of the pilot valve 158 to vary the size of the variable orifice 19. Since the position of the pilot valve 158 is determined by the speed of the turbine 13 through the rotor assembly 128 in the same manner as described in connection with the first system, the inlet pressure and flow into the turbine 13 will be controlled to control the rotational speed of the turbine.

In both of the systems, the damping or feed back systems operate in the same manner. Fluid pressure downstream of the variable orifice 19 is referenced to the chamber C through the reference passage 35, to impose a closing bias on the throttle valve 18 through the diaphragm 194 and the rod 206. This bias is opposed by the pressure in the chamber A and the ambient pressure in chamber D and is augmented by the pressure in chamber B. When, for example, a heavy load is suddenly removed from the turbine 13, the rate of increase in turbine speed is high and a corresponding rapid change in throttle valve position is required. The pilot valve will move to cause the throttle valve to snap toward closed position as described above so that the pressure in the chamber C will be lowered and the resistance to opening movement of the throttle valve when set speed is again reached will be reduced, thus substantially decreasing the time required for recovery from the abnormal change in loading of the turbine. The reverse occurs when a heavy load is suddenly applied to the turbine. It should be noted that the effectiveness of chamber C is a function of the rate of change of the turbine inlet pressure so that a form of rate controlled damping or feed back is introduced into the system in order to maintain stability even during rapid changes of loading or the turbine.

In Figure 6 is illustrated still another turbine speed control system 228 similar to that shown in Figure 1, but for the sake of simplicity a new set of reference numerals will be used to designate similar or related portions of this figure. As can be seen, the system 228 includes a sensing unit assembly 229 and a servocontrol or servomechanism assembly 230. The sensing unit 229 includes a flyweight governor portion 231 and a pilot valve portion 232, with the flyweight portion 231 connected for rotation through the turbine 233 and converting centrifugal translation of the flyweights to axial translation of the pilot valve 232. The servomechanism 230 includes control and damping means 234 and 235 which may be diaphragms or pistons (as shown), operatively associated with a throttle valve 236 controlling a variable orifice 237 connecting a fluid supply line 238 to a turbine supply line 239. The turbine 233 is drivingly connected to working mechanism 240 such as an aircraft booster pump.

For supplying high pressure to the servomechanism 230, a pair of bleed lines 241 and 242 are connected, respectively, from the high pressure supply line 238 to a control chamber E and a control chamber F. It will be noted that in this assembly the control chambers E and F are on opposite or opposed control piston (or diaphragm) sides, but not on opposite sides of the same control piston as are chambers A and B of Figure 1. From an operational point of view the actuating effect upon the throttle valve 236 is, of course, the same either way. High fluid pressure in the chamber E coacts with the control means 234 to bias the throttle valve 236 toward open position of the variable orifice 237, whereas high pressure in the chamber F coacts with the control means 235 in a reverse manner to close the variable orifice 237. A pair of orifices or restrictions 243 and 244, respectively, are provided in the respective bleed lines 241 and 242 to restrict flow therethrough into the chambers E and F, respectively, so as to induce a pressure differential in response to fluid flow.

For connecting the servomechanism control chambers E and F to a pair of ports 245 and 246 in the sensing unit 229, interconnect reference lines 247 and 248, are respectively provided. An ambient pressure reference line 249 connects the sensing unit 229 to the ambient air through a pilot port 250. In the neutral position shown in Figure 6, the pilot valve 232 closes both the ports 245 and 246, the port 250 remaining open. However, when the valve 232 is biased upwardly, the port 246 is connected to the ambient air via the port 250; and when the valve 232 is biased downwardly, the port 245 is connected to the ambient air via the port 250. Referencing the port 246 to the ambient atmospheric air produces a flow from the supply line 238 through the chamber F and the sensing unit 229. The consequent pressure drop through the orifice 244 reduces the pressure in the chamber F to bias the throttle valve 236 toward opening position of the variable orifice 237, responsive to the higher pressure in chamber E. When the port 245 is referenced to ambient air, the pressure in the chamber E is lowered in a similar manner to bias the throttle valve 236 toward closing position relative to the variable orifice 237, in response to the higher pressure in chamber F. (The structure indicated by the reference numbers 261 and 262 is non-existent in this unit, and will be discussed hereinafter.)

As can be seen, the piston 234 divides one end of the servomechanism 230 into chambers E and G, and the piston 235 divides the other end of the servomechanism 230 into chambers F and H. As has been explained, chambers E and F cooperate respectively with pistons 234 and 235 to supply oppositely directed air pressure for controlling the movement of the throttle valve 236 and are, therefore, means for exerting air pressure against opposite piston (or diaphragm) sides. In like manner, chambers G and H cooperate respectively with pistons 234 and 235 to supply oppositely directed air pressure for controlling the movement of the throttle valve 236.

One of the damping means which may be used with, or instead of, a second damping means to be described hereinafter is a damping means employing chambers G and H. The damping chamber G is referenced to turbine upstream pressure (in line 239) by means of reference 251, via the three-way valve 252 set as shown; whereas the chamber H is referenced to ambient pressure through a port or opening 253. It will thus be seen that high pressures in the chamber G augment action of the pressure chamber F to bias the throttle valve 236 toward orifice closing position.

A second damping means which may be used with, or instead of the first means just described is a means involving the use of the sensing unit 229. This means employs a reference line 254 which, like the reference line 251, is a feed back line communicating with the turbine upstream or supply line 239. As has been pointed out hereinbefore, the action of each of the sensing units 12, 12a and 229 involves coaction between the oppositely directed axial forces imparted to the pilot valve 232 by the flyweight portion 231 and a control spring, shown in Figure 6 at 255. As shown in Figure 6, however, the spring end of the sensing unit 229 is divided by a piston (or diaphragm) 256 into a spring chamber J vented to ambient air at the port 257 and damping chamber K communicating with the feed back reference line 254. It will thus be seen that an increase in the pressure in the upstream or turbine supply line 239 augments the action of the flyweight portion 231 against the control spring 255 in urging the pilot valve 232 downward, thereby to vent to ambient air the chamber E and close the valve 236.

Referring to Figure 7, it will be seen that the sensing unit 11 may be modified to carry out the function of the sensing unit 229 merely by the incorporation therein of an internally threaded nipple engagement portion, shown at 259, which could be used to engage the reference line 254 of Figure 6 and afford communication therefrom to the chamber K'; and insertion of plug 112a in line 112. Assuming minimum leakage along the valve portion 15a, the fluctuations in upstream turbine pressure would be referenced to the chamber K' and against the diaphragm 96 in the same manner as such damping pressures are employed against the piston 256 of Figure 6. Adjustment of the spring compression may be made at the preload washers 110.

Also, the damping action involving the reference line 254 may be employed alone simply by turning the three-way valve 252 so as to close the feed back line 251 and vent the chamber G of the servomechanism 230 to ambient air; or the damping action involving the feed back line 251 may be employed alone simply by turning the three-way valve 252 to the position shown in Figure 6 and closing the valve 260 in the reference line 254. Preferably, both damping means are employed in cooperation, since it has been found that their action in combination produces unusually reliable stability of operation.

It will also be apparent to one skilled in the art that control arrangement of Figure 4 could be employed using the sensing unit 229 of Figure 6. In such an arrangement, the unit 229 could be substituted for the unit 120 of Figure 4 and the principal line changes necessary would include tying the feed back line 254 (Fig. 6) into the turbine supply line 21 (Fig. 4), typing the ambient vent line 249 (Fig. 6) into the supply header 20 (Fig. 4), closing the passages 112, and an additional ambient vent line comparable to the line serving port 180 (Fig. 4) suitably communicating with a chamber between the port 245 and chamber K (Fig. 6) defined, for example, in dotted lines in Fig. 6 by an annular recess 261 and communicating port 262. In such case the increases in the turbine supply line 21 would effectively accelerate or augment the action of the flyweight portion 231 in biasing the pilot valve 232 into position to permit supply pressure to pass through the pilot valve 232 and into chamber B to urge the orifice 19 closed.

Because of the particular effectiveness of the damping or feed back systems in conjunction with the other features of the two systems described, it has been determined by test that the speed of the turbine can be controlled within an error range of less than 3%, regardless of the magnitude of load change. It has also been found by test that the turbine will attain set speed after only one or two oscillations of a magnitude of less than 5% of set speed when the unit is started from a standstill.

From the above description, it will be understood that the present invention provides a turbine speed control system which is substantially simplified, including improved damping means to substantially prevent oscillations in speed about the set or desired speed. The control system accurately and quickly compensates for variations in both air inlet pressure and temperature, and in turbine loading. A minimum of hysteresis is present in the system so that optimum sensitivity and accuracy of control is obtained. Several improved structural features are incorporated to improve the operational characteristics of the system and to substantially decrease the cost of production of the various components.

It will be understood that modifications and variations may be effected without departing from the scope of the novel concepts of the present invention.

We claim as our invention:

1. In a speed control system, a fluid motor, a source of fluid under pressure for said motor, a conduit connecting said source of said fluid under pressure to said motor, a servomechanism with means defining a variable orifice in said conduit for controlling fluid flow from the pressure source to the fluid motor and having a sensing unit having mechanism therein connected for rotation with the motor for controlling the variable orifice to maintain a predetermined rotational speed of the motor, the improvement of fluid pressure responsive damping means actuated by fluid pressure downstream from the servomechanism and upstream from the fluid motor, said damping means comprising first shiftable devices in said servomechanism operatively associated with said variable orifice defining means, first means referencing the fluid pressure between the orifice and the fluid motor to one side of one of said shiftable devices to bias the orifice defining means toward closing position, second means referencing ambient atmospheric pressure to one side of another of said first shiftable devices to oppose the bias of said first referencing means, second shiftable devices operatively associated with said sensing unit mechanism, and third means referencing the fluid pressure between the orifice and the fluid motor to one side of said second shiftable devices for augmenting the biasing action of said first referencing means.

2. In a speed control system, a fluid motor, a source of fluid under pressure for said motor, a conduit connecting said source of said fluid pressure to said motor, a throttle valve in said conduit, a pilot valve adapted to control the throttle valve for controlling fluid flow therethrough from said pressure source to said motor, diaphragm means connected to said pilot valve, centrifugal mechanism biasing said pilot valve in one direction, resilient means biasing said pilot valve in an opposite direction, and a fluid connection referencing the pressure between said throttle valve and said fluid motor to one side of said diaphragm means for biasing said pilot valve against said centrifugal mechanism biasing means.

3. In a speed control system, a fluid motor, a source of fluid under pressure for operating said motor, a conduit connecting said source of fluid pressure to said motor, a servomechanism in said conduit and comprising a casing having a fluid passage therethrough pressure connecting said pressure source to said fluid motor, a throttle valve reciprocably mounted in said casing for controlling flow through said fluid passage, a pair of flexible diaphragms attached at opposite ends of said throttle valve and cooperating with the walls of said casing to define four separate pressure chambers in the casing, means referencing fluid pressure from said pressure source to two of said chambers for biasing said throttle valve in opposite directions, pressure reducing means for substantially lowering the pressure of fluid flowing into said two chambers, means referencing the pressure of the fluid between said throttle valve and said fluid motor to another of said chambers to bias said throttle valve toward closing position, means referencing ambient atmospheric pressure to the remaining chamber, a pilot valve in communication with said two chambers for selectively venting to pressure one only of said two chambers, and means referencing the pressure of the fluid between said throttle valve and said fluid motor to said pilot valve to bias the same to vent one of said two chambers.

4. In a speed control system, a fluid motor, a source of fluid under pressure for operation of said motor, a conduit connecting said source of fluid under pressure to said motor, a motor speed sensing unit comprising a casing, said casing having a valve bore therein and three axially spaced radial ports communicating therewith, a pilot valve slidably mounted in said bore and having a pair of spaced radially enlarged portions connected by a reduced diameter stem, said enlarged portions being the same distance apart as the two outermost ports to block the same when in central position and to permit fluid flow between the middle port and only one of the outermost ports when displaced from central position, spring means biasing said pilot valve in one direction, centrifugal mechanism rotatably mounted in said casing and connected for rotation with said fluid motor, said mechanism including means associated with said pilot valve for moving the same against the bias of said spring means in response to increasing centrifugal force, an additional casing port adapted to communicate with said conduit, and pressure responsive means in communication with said additional port in said casing for opposing the bias of said spring means.

5. In a speed control system, a fluid motor, a source of fluid under pressure for operation of said motor, a conduit connecting said source of fluid under pressure to said motor, a motor speed sensing unit comprising a casing, said casing having a valve bore therein and three axially spaced radial ports communicating therewith, a pilot valve slidably mounted in said bore and having a pair of spaced radially enlarged portions connected by a reduced diameter stem, said enlarged portions being the same distance apart as the two outermost ports to block the same when in central position and to permit fluid flow between the middle port and only one of the outermost ports when displaced from central position, spring means biasing said pilot valve in one direction, a rotor assembly rotatably mounted in said casing, means for connecting said rotor to said fluid motor for rotation therewith, a flexible sealing diaphragm in said casing between said rotor assembly and said pilot valve, means rotatably attached to said rotor assembly and abutting the central portion of said diaphragm to clamp the central portion between the rotatable means and one end of said pilot valve, means in said rotor assembly operable by centrifugal force to urge said rotatable means against said diaphragm to urge said pilot valve against the bias of said spring means, a second flexible sealing diaphragm in said casing between said spring means and said pilot valve, and means for affording fluid communication between said conduit and the pilot valve side of said diaphragm for urging the same against said spring means.

6. In a turbine speed control system, a speed sensing unit comprising a casing having a rotor chamber, a valve section with an axial bore therein and a spring compartment, flexible sealing diaphragms in said casing pressure sealing said rotor chamber from said valve section and said valve section from said spring compartment, said valve section having three axially spaced ports therein communicating with said axial bore, a pilot valve slidably disposed in said bore and alternately connecting the middle port with one or the other of the outermost ports in response to reciprocation of the valve, spring means urging the central portion of one of said diaphragms against one end of said pilot valve and biasing said pilot valve in one direction to urge the other end against the central portion of the other diaphragm, centrifugal rotor mechanism rotatably mounted in said rotor chamber and connected for rotation with said turbine, means rotatably attached to said centrifugal mechanism and abutting the central portion of said other diaphragm on the side opposite to said other end of the pilot valve, means in said centrifugal mechanism to urge said rotatable means against said other diaphragm to urge said pilot valve against the bias of said spring means, an interconnecting passage between said rotor chamber and said spring compartment to equalize the pressures therein, and a passage in said valve section adapted to supply pressure against one only of the opposed faces of said diaphragms.

7. In a speed control system for a turbine propelled by fluid from a pressure source, a speed sensing unit comprising a casing, a centrifugal rotor assembly in said casing, an anti-friction bearing rotatably supporting said rotor assembly in said casing, a shaft reciprocably mounted in said rotor assembly, diverging inner walls formed at one section of said rotor assembly, arms pivotally mounted on said shaft, flyweights rotatably mounted at the outer end portions of said arms and adapted to travel along said diverging walls, whereby centrifugal force induced by rotation of said rotor assembly moves said shaft axially by movement of said flyweights along said diverging walls, an anti-friction bearing mounted on the outward end portion of said shaft, a retainer rotatably supported on said shaft and on said shaft anti-friction bearing, said casing having a valve bore in one portion thereof with a plurality of ports communicating therewith, a pilot valve slidably disposed in said bore and alternately connecting different ports in response to reciprocation thereof, a flexible sealing diaphragm between said rotor assembly and said pilot valve and having its central portion clamped between said retainer and one end of said pilot valve, first biasing means urging said pilot valve in opposition to the movement induced by rotation of said rotor assembly, and counter acting bias means for said first biasing means adapted to be actuated in response to said fluid pressure.

References Cited in the file of this patent

UNITED STATES PATENTS

| | | |
|---|---|---|
| 826,980 | Wilkinson | July 24, 1906 |
| 1,063,546 | Kieser | June 3, 1913 |
| 1,093,116 | Cubelic | Apr. 14, 1914 |
| 1,464,749 | Dahlstrand | Aug. 14, 1923 |
| 1,561,773 | Carpenter | Nov. 17, 1925 |
| 1,910,322 | Coffin et al. | May 23, 1933 |
| 1,995,885 | Gutermuth | Mar. 26, 1935 |
| 2,020,847 | Mitereff | Nov. 12, 1935 |
| 2,113,416 | Warren | Apr. 5, 1938 |
| 2,197,171 | Annin | Apr. 16, 1940 |
| 2,208,539 | Brown | July 16, 1940 |
| 2,342,763 | Smith | Feb. 29, 1944 |
| 2,364,817 | Reggio | Dec. 12, 1944 |

FOREIGN PATENTS

| | | |
|---|---|---|
| 27,022 | Great Britain | 1911 |
| 603,305 | Great Britain | June 14, 1948 |
| 402,852 | Italy | Mar. 26, 1943 |